US012484188B2

(12) United States Patent
Dibbad et al.

(10) Patent No.: US 12,484,188 B2
(45) Date of Patent: Nov. 25, 2025

(54) THERMAL COOLING REGULATION BASED ON POWER PROFILE

(71) Applicant: QUALCOMM Incorporated, San Diego, CA (US)

(72) Inventors: Vijayakumar Ashok Dibbad, Bangalore (IN); Jeffrey Gemar, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 413 days.

(21) Appl. No.: 18/147,412

(22) Filed: Dec. 28, 2022

(65) Prior Publication Data

US 2024/0224467 A1  Jul. 4, 2024

(51) Int. Cl.
G06F 1/20 (2006.01)
H05K 7/20 (2006.01)

(52) U.S. Cl.
CPC ......... H05K 7/20281 (2013.01); G06F 1/206 (2013.01)

(58) Field of Classification Search
CPC . G06F 1/206; H05K 7/20281; H05K 7/20836
USPC ....................................................... 700/299
See application file for complete search history.

(56) References Cited

U.S. PATENT DOCUMENTS

| | | | |
|---|---|---|---|
| 2008/0032168 A1* | 2/2008 | Fujita ................ | H01M 8/04029 429/442 |
| 2009/0126902 A1* | 5/2009 | Choe ..................... | H01M 8/241 165/41 |
| 2009/0218078 A1* | 9/2009 | Brunschwiler ........... | G06F 1/20 361/679.53 |
| 2009/0234705 A1* | 9/2009 | Brunschwiler .... | H05K 7/20836 361/679.53 |
| 2011/0132579 A1* | 6/2011 | Best .................... | H05K 7/20327 165/104.31 |
| 2012/0123595 A1* | 5/2012 | Bower, III ......... | H05K 7/20772 700/282 |
| 2013/0264045 A1* | 10/2013 | Chainer .................. | G06F 1/206 165/104.33 |
| 2016/0066472 A1* | 3/2016 | Cader ..................... | G06F 1/206 361/699 |
| 2020/0170144 A1* | 5/2020 | Guo .................... | H05K 7/20945 |
| 2021/0161033 A1* | 5/2021 | McEathron ............. | G06F 1/183 |

* cited by examiner

*Primary Examiner* — Chun Cao
(74) *Attorney, Agent, or Firm* — Muncy, Geissler, Olds & Lowe, P.C.

(57) ABSTRACT

Methods for thermal cooling implemented by a processor of a thermal cooling system may include receiving a power profile input associated with a power consuming unit cooled by a coolant within the thermal cooling system, estimating a peak Tj of the power consuming unit during an upcoming interval based on the power profile input, a coolant temperature regulation point, and a coolant flow rate, and changing at least one of the coolant temperature regulation point or the coolant flow rate in response to the estimated peak Tj varying from a predesignated Tj limit by a predetermined threshold.

18 Claims, 6 Drawing Sheets

THERMAL COOLING REGULATION BASED ON POWER PROFILE

BACKGROUND

Cooling systems, such as the liquid cooling of computing devices and/or other electronic components in data centers or in modern motor vehicles, are often used to protect such devices from overheating and optimize performance conditions. In such systems, a chiller may maintain a coolant (e.g., liquid) at a predefined temperature, which is generally configured to cool for maximum power conditions or maximum thermal ramp-up of the electronic device being cooled. In this way, the predefined temperature, which may be referred to as a temperature regulation point may be inversely proportional to the electronic device's maximum power dissipation. An electronic device with higher power dissipation needs requires liquid coolant temperatures to be maintained at a lower level as compared to an electronic device with lower power dissipation needs.

Conventional liquid cooling techniques regulate the temperature of the liquid coolant, such as in the case of a processor or semiconductor in which the coolant ensures the junction temperature stays under a predesignated maximum. These liquid cooling techniques often use an open loop scheme designed to limit the junction temperature based on a worst-case power dissipation scenario. In this way, the temperature of the liquid coolant is maintained at a static level in anticipation of the worst-case maximum level of power consumption.

SUMMARY

Various aspects include methods that may be implemented on a processor of a thermal cooling system including receiving, by the processor, a power profile input associated with a power consuming unit cooled by a coolant within the thermal cooling system, estimating, by the processor, a peak Tj of the power consuming unit during an upcoming interval based on the power profile input, a coolant temperature regulation point, and a coolant flow rate, and changing, by the processor, at least one of the coolant temperature regulation point or the coolant flow rate in response to the estimated peak Tj varying from a predesignated Tj limit by a predetermined threshold. In some aspects, estimating the peak Tj may be further based on an estimated peak power consumption level of the power consuming unit during the upcoming interval. In some aspects, changing at least one of the coolant temperature regulation point or the coolant flow rate may reduce a difference between the predesignated Tj limit and an actual peak Tj of the power consuming unit during the upcoming interval.

In some aspects, changing the coolant temperature regulation point may include raising the coolant temperature regulation point in response to the estimated peak Tj being less than the predesignated Tj limit by the predetermined threshold. In some aspects, changing the coolant temperature regulation point may include lowering the coolant temperature regulation point to a lowest temperature regulation point associated with a maximum power consumption level of the power consuming unit in response to the estimated peak Tj being less that the predesignated Tj limit by the predetermined threshold.

In some aspects, changing the coolant flow rate may include lowering the coolant flow rate in response to the estimated peak Tj being less than the predesignated Tj limit by the predetermined threshold.

Some aspects may include continuously or periodically repeating operations of receiving an additional power profile input associated with the power consuming unit, estimating another peak Tj of the power consuming unit during another upcoming interval, and changing at least one of the coolant temperature regulation point or the coolant flow rate in response to the other estimated peak Tj varying from the predesignated Tj limit by the predetermined threshold.

Some aspects may further include estimating, by the processor, a time between adjacent power profile peaks, wherein the coolant temperature regulation point is changed further in response to the time between adjacent power profile peaks exceeding a temporal threshold.

Further aspects may include a processor for use in a thermal cooling system configured to perform operations of any of the methods summarized above. Further aspects may include a thermal cooling system configured with processor-executable instructions to perform operations of any of the methods summarized above. Further aspects may include a thermal cooling system including means for performing functions of any of the methods summarized above.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

Various embodiments include methods and apparatus implementing such methods for thermal cooling regulation based on power profiles. In various embodiments, a processor of a resource manager in a thermal cooling system may receive a power profile input from or associated with a power consuming unit (e.g., a computing device, processor unit, memory, or other electronic device) that is thermally regulated by a coolant within the thermal cooling system. The processor of the resource manager may estimate a peak junction temperature (i.e., "Tj") of the power consuming unit during an upcoming interval based on the received power profile input, a coolant temperature regulation point, and a coolant flow rate.

Alternatively, a processor in a chiller or other cooling mechanism in the thermal cooling system may receive the power profile input from the power consuming unit, the resource manager, another device, or a combination thereof. Thus, the processor in the chiller or other cooling mechanism may estimate the Tj of the power consuming unit during the upcoming interval based on the received power profile input, the coolant temperature regulation point, and the coolant flow rate.

The processor of the resource manager and/or the chiller may then change at least one of the coolant temperature regulation point or the coolant flow rate in response to the estimated peak junction temperature varying from a predesignated junction temperature limit by a predetermined threshold. Such methods may be repeated continuously, periodically, or episodically.

Many high power electronic devices and systems, such as servers, high power processors, memories, and the like, are cooled by the chiller or other cooling mechanism to maintain the temperature of the coolant at a desired coolant temperature regulation point. Such cooling mechanisms generally include pumps and heat exchangers responsible for regulating liquid temperature, but they consume more power than most other components of the thermal cooling system. Regulating coolant temperatures to a fixed value, irrespective of conditions under which a power consuming unit is operating, may leads to inefficiency in terms of power consumption. The lower the temperature maintained by the chiller; the more power consumed by pumps and other cooling components. Thus, running the chiller more or at a lower temperature than necessary may waste energy.

The terms "junction temperature" and "junction," as well as the abbreviation "Tj" are used interchangeably herein to refer to a thermal junction temperature, which is the temperature of active regions of a power consuming unit. Tj max (i.e., "$Tj_{MAX}$") refers to a highest operating temperature the power consuming unit should be allowed to achieve without risking compromise to the hardware. In order to prevent the power consuming unit from exceeding $Tj_{MAX}$ various embodiments may use thermal control mechanisms internal and/or external to the power consuming unit to limit temperature. In operation, the Tj is generally higher than the temperature of an outer case and/or the exterior of the power consuming unit.

The term "power consuming unit" as used herein refers generally to any of a variety of thermally sensitive electronic components or devices that generate heat while using (i.e., consuming) electrical power to operate. A power consuming unit may be any of a processor, micro-processor, controller, system on chip, semiconductor, CPU, battery, modem, memory unit, sensor, antenna computing device, server, and the like. Power consuming units may use more or less power depending on the type and/or number of operations being performed. For example, heavy graphics processing, file compression, computer learning, artificial intelligence applications, and the like may push the limits of processing power on a system, using the highest levels of power, and generating heat in the process.

The term "power profile input" as used herein refers to information associated with a level of power consumption by a power consuming unit. For example, the power profile input may include a temperature reading (e.g., $Tj_{MAX}$) of the power consuming unit or a processor, other component, or portion thereof. Additionally, or alternatively, the power profile input may include information about an operation or function being performed or going to be performed by the power consuming unit and for which a Tj may be determined and/or estimated.

The term "electronic device" as used herein refers to any component in an electronic system either active or passive. Components may be connected together to create an electronic circuit with a particular function. Components may be packaged singly, or in more complex groups as integrated circuits. Passive electronic components include capacitors, inductors, resistors, whilst active components include semiconductor devices; transistors and thyristors, which control current flow at electron level.

The term "computing device" as used herein refers to an electronic device equipped with at least a processor, memory, and a device for receiving input and transmitting an output. In some embodiments, a computing device may include wired and/or wireless communication devices such as a transceiver and antenna configured to communicate with communication networks. A computing device may include any one or all of a vehicle on-board computer, embedded computer, server, desktop computer, laptop computer, personal computer, tablet computer, all-in-one computer, workstation, supercomputer, mainframe computer, home theater computer, game console, cellular telephone, smartphone, portable computing device, personal or mobile multimedia player, and similar electronic devices that include a memory, communication components, and a programmable processor.

Various embodiments include closed loop coolant temperature regulation methods that may be implemented in a processor of a thermal cooling system to dynamically adapt either or both of the coolant temperature regulation point and/or the coolant flow rate based on power profiles for the operation conditions or state of one or more of power consuming units. The thermal cooling system is configured so that circulating coolant will remove heat generated by the at least one power consumption unit. Various embodiments may be used in conjunction with a liquid coolant (e.g., dielectric liquid or water) and/or a gaseous coolant fluid (e.g., air). As used herein, the term "liquid" refers to a nearly incompressible fluid that conforms to the shape of its container but retains a constant volume independent of pressure.

Figure 1A:
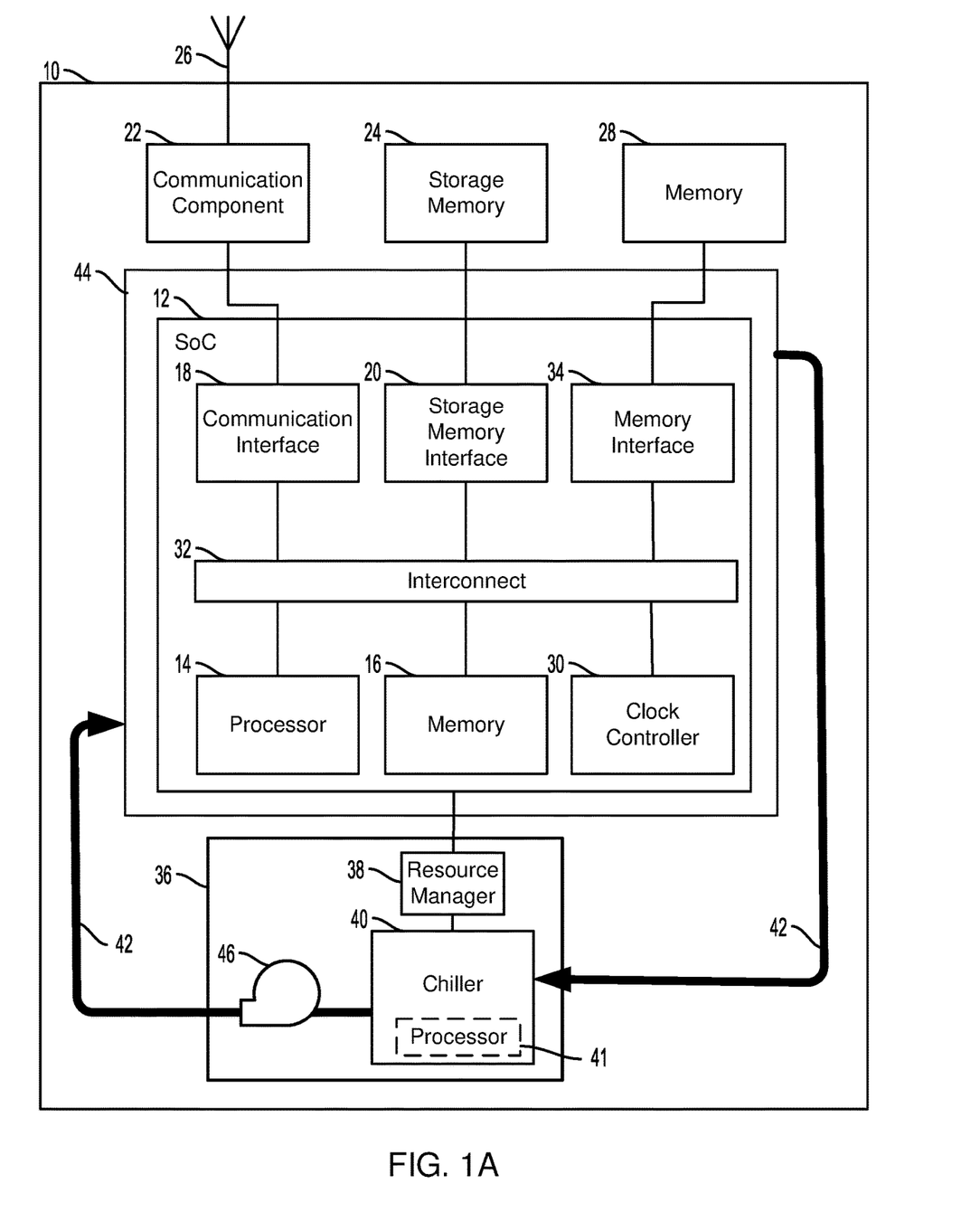
FIG. 1A is a component block diagram illustrating an example computing device suitable for implementing various embodiments.

FIG. 1A illustrates a system including a computing device 10 that is cooled by a thermal cooling system 36 suitable for use with various embodiments. The computing device 10 may include an example of a power consuming unit in the form of a system on chip (SOC) 12. The SOC 12 includes a processor 14, a memory 16, a communication interface 18, a storage memory interface 20, a clock controller 30, an interconnect 32 (e.g., a data bus), and a memory interface 34. The computing device 10 may further include a communication component 22, such as a wired or wireless modem, a storage memory 24, an antenna 26 for establishing a wireless communication link, and memory 28. The computing device 10 may be coupled electronically and fluidically to a thermal cooling system 36 that includes a resource manager 38, a chiller 40, coolant conduits 42, and coolant chamber 44. The processor 14 may include any of a variety of processors, for example a number of processor cores.

The term "system on chip" or the abbreviation "SOC" are used herein interchangeably to refer to a set of interconnected electronic circuits typically, but not exclusively, including a processor, a memory, and a communication interface. A processor may include a variety of different types of processors 14 and processor cores, such as a general purpose processor, a central processing unit (CPU), a digital signal processor (DSP), a graphics processing unit (GPU or GFX), an accelerated processing unit (APU), a secure processing unit (SPU), a network processor, neural network processing unit (NPU), double data rate (DDR) memory, a subsystem processor of specific components of the computing device, such as an image processor for a camera subsystem or a display processor for a display, an auxiliary processor, a single-core processor, a multicore processor, a controller, a microcontroller, and the like. A processor may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

A SOC (e.g., SOC 12) may be part of a system in a package (SIP), which may include a single module or package that contains multiple resources, computational units, cores and/or processors on two or more integrated circuit (IC) chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single computing device. The proximity of the SOCs facilitates high speed communications and the sharing of memory and resources.

The SOC 12 may include one or more processors 14. The computing device 10 may include more than one SOC 12, thereby increasing the number of processors 14 and processor cores. The computing device 10 may also include processors 14 that are not associated with an SOC 12. The processors 14 may each be configured for specific purposes that may be the same as or different from other processors 14 of the computing device 10. One or more of the processors 14 and processor cores of the same or different configurations may be grouped together. A group of processors 14 or processor cores may be referred to as a multi-processor cluster.

The computing device 10 may include any number and combination of memories, such as the memory 16 integral to the SOC 12 and the memory 28 separate from the SOC 12. Any of the memories 16, 28 may be a volatile or non-volatile memory configured for storing data and processor-executable code for access by the processor 14. The computing device 10 and/or SOC 12 may include one or more memories 16, 28 configured for various purposes. One or more memories 16, 28 may include volatile memories such as random access memory (RAM) or main memory, including static RAM (SRAM), such as the memory 16, dynamic RAM (DRAM), such as the memory 28, or cache memory.

The interconnect 32 may be a communication fabric, such as a communication bus, configured to communicatively connect the components of the SOC 12. The interconnect 32 may transmit signals between the components of the SOC 12. In some embodiments, the interconnect 32 may be configured to control signals between the components of the SOC 12 by controlling timing and/or transmission paths of the signals.

The memories 16, 28 may be configured to temporarily store a limited amount of data received from a data sensor or subsystem, data and/or processor-executable code instructions that are requested from a non-volatile memory 16, 24, 28 loaded to the memories 16, 28 from the non-volatile memory 16, 24, 28 in anticipation of future access based on a variety of factors, and/or intermediary processing data and/or processor-executable code instructions produced by the processor 14 and temporarily stored for future quick access without being stored in non-volatile memory 16, 24, 28. The memory 16, 28 may be configured to store data and processor-executable code in parts of the memory 16, 28 configured to store data and processor-executable code for secure computing operations, referred to herein as a secure portion. The memory 16, 28 may be configured to store data and processor-executable code in parts of the memory 16, 28 configured to store data and processor-executable code for non-secure computing operations, referred to herein as a non-secure portion.

The memory interface 34 may work in unison with the memory 28 to enable the computing device 10 to store and retrieve data and processor-executable code on and from the memory 28. The memory interface 34 may control access to the storage memory 28 and allow the processor 14 to read data from and write data to the memory 28.

The storage memory interface 20 and the storage memory 24 may work in unison to allow the computing device 10 to store data and processor-executable code on a non-volatile storage medium. The storage memory 24 may be configured much like an embodiment of the memory 16 in which the storage memory 24 may store the data or processor-executable code for access by one or more of the processors 14. The storage memory 24, being non-volatile, may retain the information after the power of the computing device 10 has been shut off. When the power is turned back on and the computing device 10 reboots, the information stored on the storage memory 24 may be available to the computing device 10. The storage memory interface 20 may control access to the storage memory 24 and allow the processor 14 to read data from and write data to the storage memory 24.

The resource manager 38 of the thermal cooling system 36 may be configured to monitor and or receive information regarding power states of one or more of the components of the computing device 10 and/or the SOC 12. The resource manager 38 may also be a SOC or at least include a processor for making determinations for managing the operation of components of the computing device. In some embodiments, the resource manager 38 may be configured to receive power state information inputs from one or more of the components of the computing device 10, the SOC 12, and/or external components working in conjunction with the computing device 10. The received inputs may indicate when, how, operating state, information regarding the extent components of the computing device 10 will be operating, and/or information regarding as how much power each component typically uses (i.e., a power profile) under current or predicted operating states. In some embodiments, if the received input indicates that one of the components will execute a known routine, the resource manager 38 may be configured to lookup information in a stored data table that indicates how much power or a power profile that the component typically uses in executing the indicated routine.

A power profile may reflect historical or simulated power usage by the SOC 12 or a particular component thereof when performing the indicated function. Received inputs associated with power usage by a component may be referred to as power profile inputs.

As an example, the resource manager 38 may receive one or more power profile inputs associated with a component (i.e., a power consuming unit) of the computing device 10 or SOC 12 that is cooled by the thermal cooling system 36. In some embodiments the resource manager 38 may include memory that store a data table of various power profiles, each associated with a function and/or component of the computing device 10. In some embodiments, the power profiles may be stored in memory 16 or memory 28 of the computing device 10 and configured to provide a power profile to the resource manager 38. The stored power profiles may be used by the resource manager 38 to estimate power consumption and/or a profile of the associated Tj corresponding to the received power profile input. The resource manager 38 may be configured to make determinations based on one or more of the received inputs and particularly received power profile inputs using the stored power profiles. Also, the resource manager 38 may be configured to map and/or estimate maximum power states based on prior Tj ramp rates that may be stored in memory (e.g., memory within the resource manager 38 of the thermal cooling system 36.

In addition, the resource manager 38 may be configured to signal to one or more of the components of the computing device 10, the SOC 12, and/or external components working in conjunction with the computing device 10. The signals may provide information, control commands, or combinations thereof. The resource manager 38 may communicate with components of the computing device 10 directly or through the interconnect 32. In addition, the resource manager 38 may communicate with external components through the communication component 22.

In some embodiments, the resource manager 38 may be configured to signal one or more of the components of thermal cooling system 36 to change how those components operate. For example, the resource manager 38 may signal the chiller 40 to change a coolant temperature regulation point of the thermal cooling system 36. By increasing the coolant temperature regulation point, the chiller 40 may reduce the amount of heat removed by the thermal cooling system 36 by allowing the coolant temperature to increase accordingly. Alternatively or additionally, the resource manager 38 may signal the chiller 40 to change a coolant flow rate, which controls the volume of coolant flowing through the heat exchanger 44, and thus the rate at which heat is removed from components of the computing device 10 or SOC 12. For example, the resource manager 38 may signal a pump 46 within the thermal cooling system 36 that flows coolant through the chiller 40 and the heat exchanger 44 to increase or decrease the coolant flow rate, which affects the rate at which heat is removed from the computing device 10 or SOC 12 by the heat exchanger 44 and from the coolant by the chiller 40. In this way, the resource manager 38 may be configured to control the amount of heat extracted from the components of the computing device 10 and/or SOC 12. In some embodiments, the resource manager 38 may be a power management integrated circuit (power management ICs or PMIC).

The chiller 40 may include a heat exchanger for removing heat from the coolant that was absorbed when circulating across and/or through one or more components (i.e., power consuming unit(s)) in the heat exchanger 44. The chiller 40 may include a thermometer and/or other sensors for measuring the temperature of the coolant, and the resource manager 38 may be configured to compare temperature measurements from the thermometer to a coolant temperature regulation point. The thermometer and/or other sensors may be located remote from the chiller 40 itself, such as inside the coolant conduits 42 and/or the coolant heat exchanger 44. Optionally or alternatively, the chiller 40 may include a processor 41, which be configured to perform some or all of the operations described above with regard to the processor 14 in the SOC 12. The chiller 40 will work to maintain the coolant temperature at or near the coolant temperature regulation point. In addition, the chiller 40 may include or work in conjunction with a pump 46 for making the coolant circulate in a closed loop to and from the component(s) being cooled. The pump 46 may be used to circulate the coolant to and from the components via coolant conduits 42. In addition, the coolant heat exchanger 44 may be configured to bath one or more components in coolant that get recirculated through the chiller 40. The coolant may recirculate to and from the coolant heat exchanger 44 by a pump 46. Alternatively, the system need not include a coolant heat exchanger 44, instead using only coolant conduits 42 extending to and from one or more components being cooled.

Some or all of the components of the computing device 10 and/or the SOC 12 may be arranged differently and/or combined while still serving the functions of the various embodiments. The computing device 10 may not be limited to one of each of the components, and multiple instances of each component may be included in various configurations of the computing device 10.

Figure 1B:
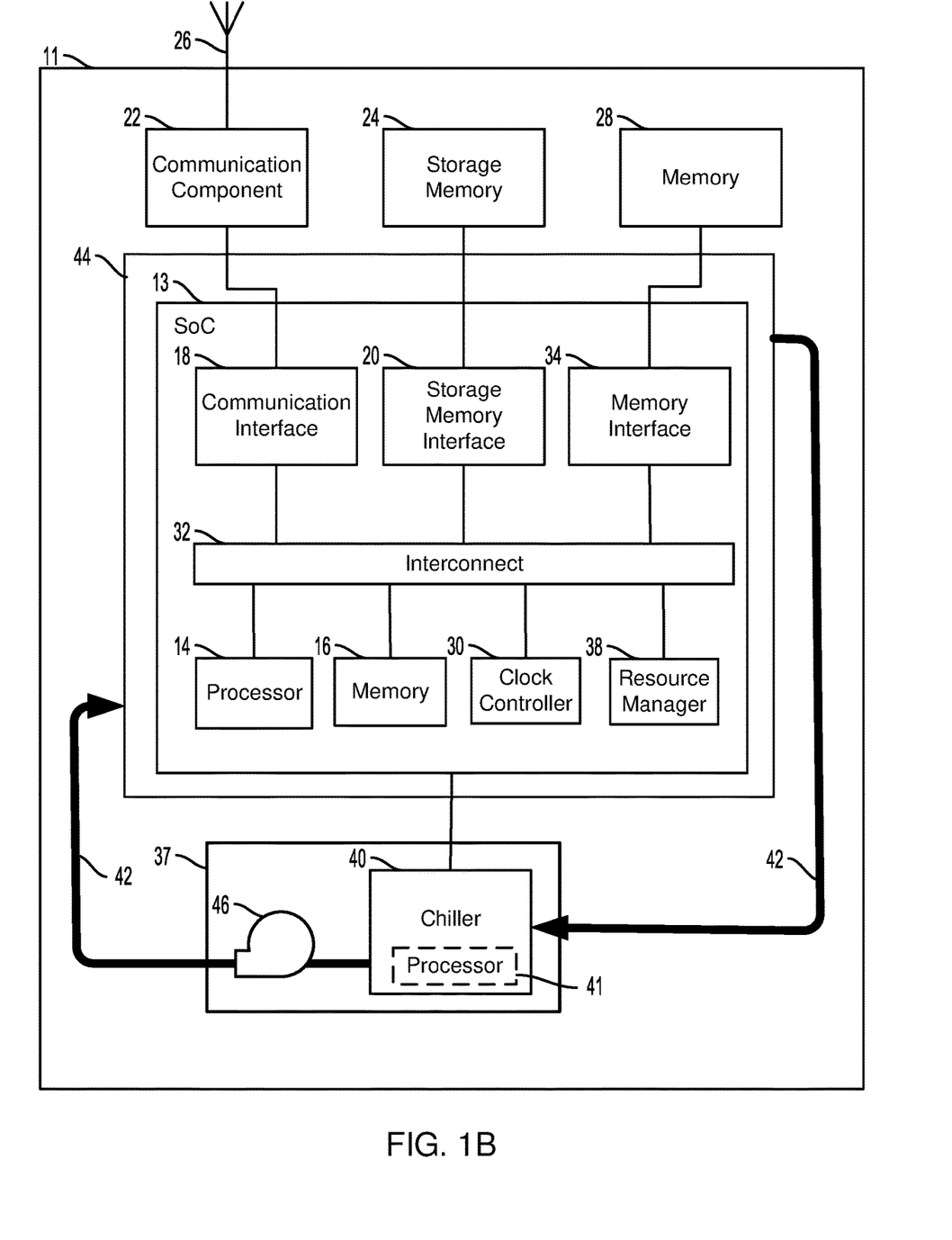
FIG. 1B is a component block diagram illustrating an example computing device suitable for implementing various embodiments.

FIG. 1B illustrates a system including an alternative computing device 11 that is cooled by a thermal cooling system 37 suitable for use with various embodiments. With reference to FIGS. 1A and 1B, the computing device 11 may include all the components and implement the functionality of the computing device 10 described with reference to FIG. 1A, but with the resource manager 38 located on the SOC 13 rather than the thermal cooling system (e.g., 36). Alternatively, the resource manager 38 may be distributed between the SOC 13 and the thermal cooling system 37. For example, a computing device may include the SOC 13 illustrated in FIG. 1B working in conjunction with the thermal cooling system 36 illustrated in FIG. 1A.

Figure 2:
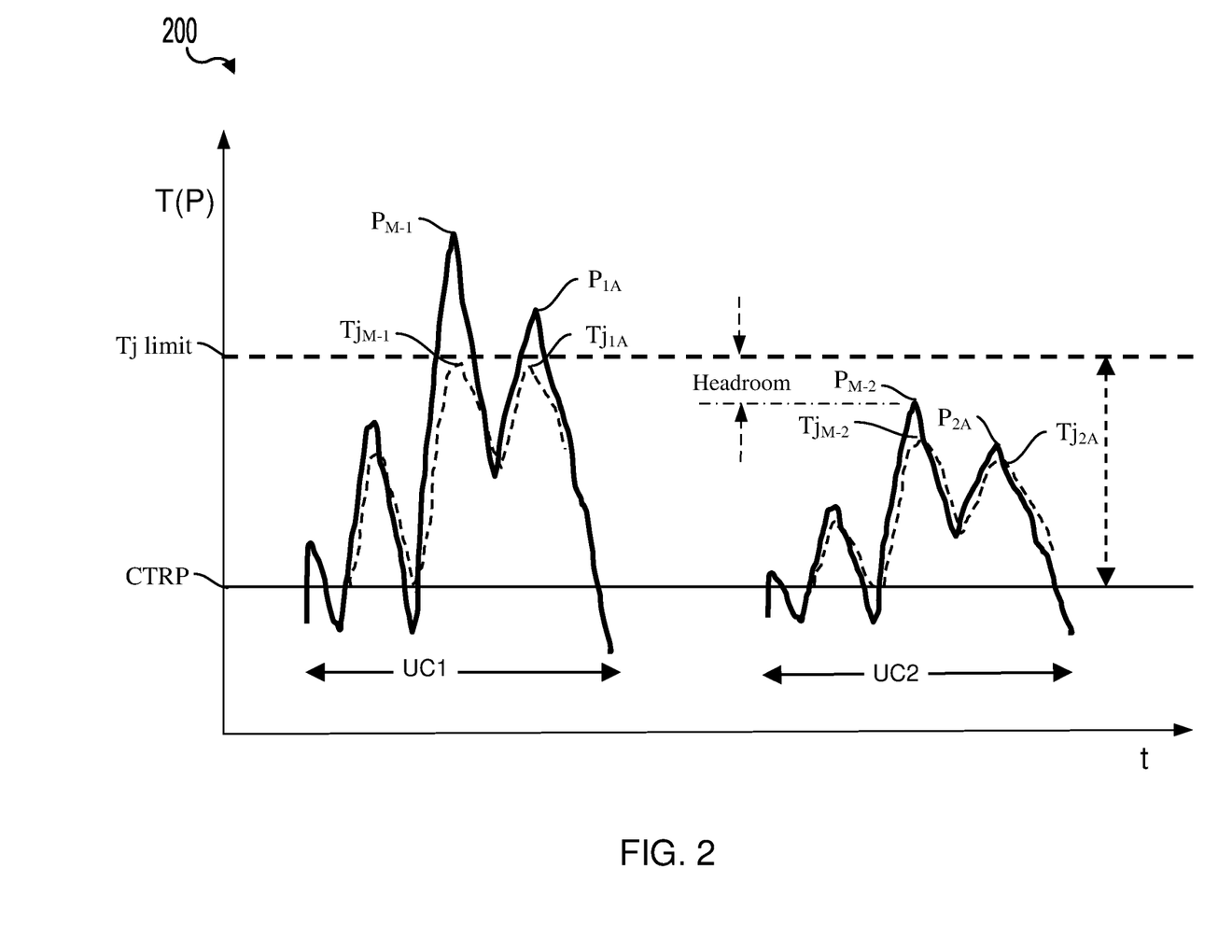
FIG. 2 is a graph illustrating example power profiles and corresponding Tj profiles for two current or predicted operating conditions of a power consuming unit using a static coolant temperature regulation point in accordance with various embodiments.
Figure 3:
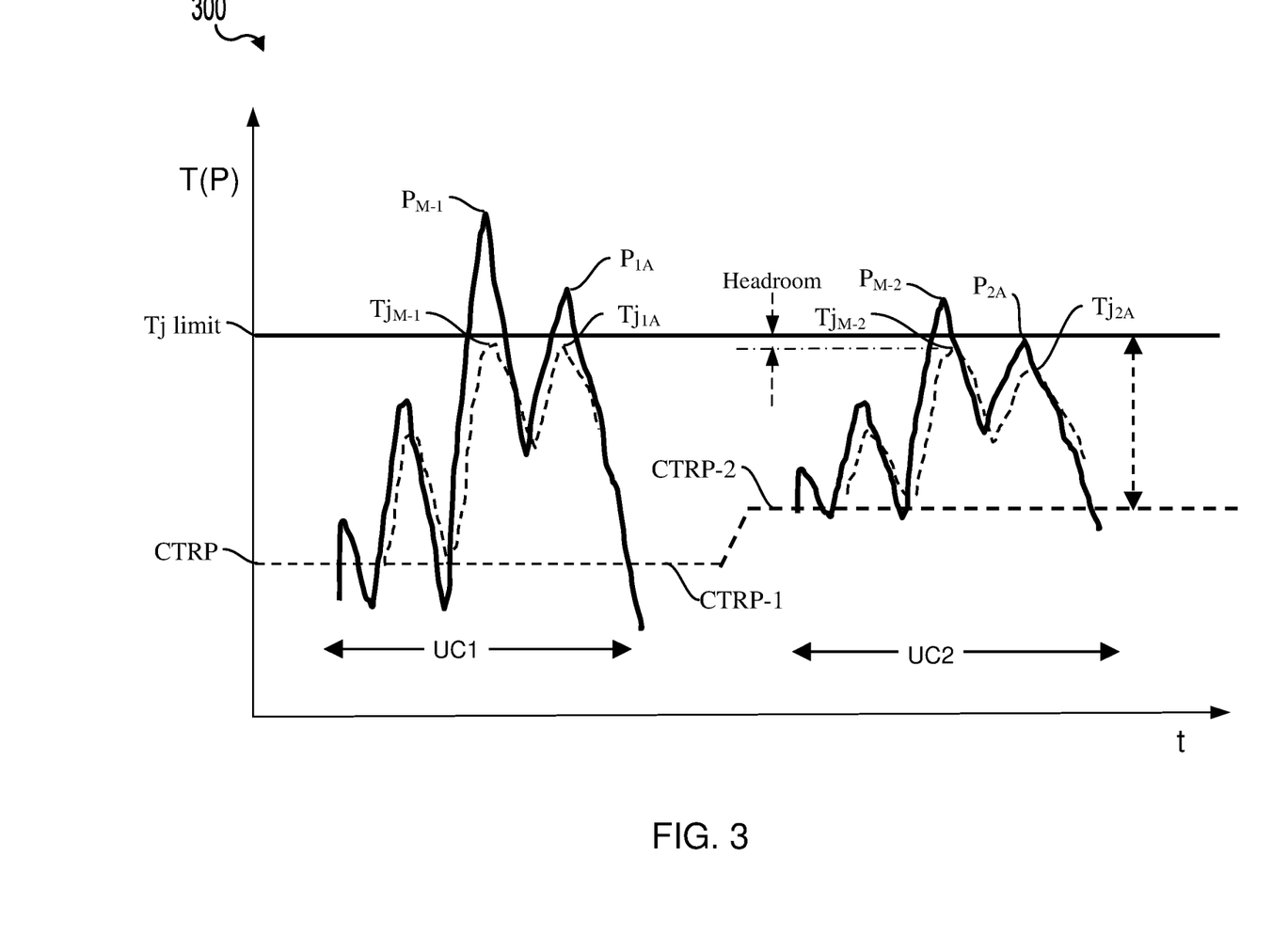
FIG. 3 is a graph illustrating example power profiles and corresponding Tj profiles for two current or predicted operating conditions of the power consuming unit using a dynamic coolant temperature regulation point in accordance with various embodiments.

FIGS. 2 and 3 illustrate graphs 200, 300 each representing power profiles and corresponding Tj profiles for two current or predicted operating conditions of the power consuming unit (i.e., UC1, UC2) of the same power consuming unit. With regard to FIGS. 1-3, although each of the graphs 200, 300 use different liquid temperature regulation point schemes, both graphs 200, 300 are defined by a vertical axis "T(P)" represents a level of power consumption (P) for the power profiles and a level of temperature (T) for the Tj profiles. In addition, the graphs 200, 300 are defined by a horizontal axis "t" representing time. Each current or predicted operating condition of the power consuming unit UC1, UC2 may represent a particular set of conditions that have a corresponding maximum power level (i.e., $P_{MAX-n}$), as well as a maximum Tj (i.e., $Tj_{MAX-n}$). The power level (P) of the power consuming unit in each of the power profiles (represented by a solid line) varies up and down, with a highest peak for each current or predicted operating condition of the power consuming unit UC1, UC2 representing a maximum power level (i.e., $P_{M-1}$, $P_{M-2}$) associated with that current or predicted operating condition of the power consuming unit UC1, UC2, respectively. Each current or predicted operating condition of the power consuming unit UC1, UC2 may include additional power level peaks that are equal to or less than the $P_{M-1}$, $P_{M-2}$ respectively. For example, the second highest power level (i.e., $P_{1,A}$, $P_{2,A}$) for each current or predicted operating condition of the power consuming unit UC1, UC2 is also indicated. Similarly, each current or predicted operating condition of the power consuming unit UC1, UC2 has a Tj level (T) of the power consuming unit (represented by a dotted line) having a similar pattern to that of the power level profile. In this way, each current or predicted operating condition of the power consuming unit UC1, UC2 may include additional Tj level peaks that are equal to or less than the $Tj_{M-1}$, $Tj_{M-2}$ respectively. For example, the second highest Tj level (i.e., $Tj_{1,A}$, $Tj_{2,A}$) for each current or predicted operating condition of the power consuming unit UC1, UC2 is also indicated.

The following may be an example of UC1 and UC2. Consider a vehicle with a computing device (e.g., 10, 11) that uses fluid cooling techniques. Also, consider the vehicle fully loaded with passengers at one point, which point corresponds to UC1. Subsequently, the vehicle may stop to let passengers exit the vehicle, such as the back-seat passengers. At that later point, the back-seat portion of the vehicle passenger compartment may have lower power and Tj profiles (i.e., lower $P_{M-n}$ and/or $Tj_{M-n}$), which may correspond to UC2. The lower power and Tj profiles could benefit from adjusting one or both of the coolant temperature regulation point (CTRP) or the coolant flow rate to accommodate the change in conditions. The change from UC1 to UC2, in this example, is not typically instantaneous (i.e., it takes some time for the passengers to exit). Thus, there should be plenty of time to raise the CTRP, which may save power. Also, since the change between UC1 and UC2 involves conditions associated with a lower $P_{M-n}$ and lower $Tj_{M-n}$, any delays in the coolant reaching the higher CTRP will not endanger the system exceeding the predesignated Tj limit.

The following may be another example of UC1 and UC2. Consider a data center cooling one or more computing devices that support numerous users. A change in the number of users being supported (e.g., based on log-in/log-out events) may correspond to predictably lower power consumption conditions. Such changes in the number of users may also correlate to a particular schedule (i.e., time of day). The lower power and Tj profiles associated with the lower power consumption conditions could benefit from adjusting one or both of the CTRP or the coolant flow rate to accommodate the change in conditions.

The examples in FIGS. 2 and 3 are for illustrative purposes and do not represent the entirety of potential power and/or Tj profiles, and do not limit the scope of the claims and specification to these examples. Other power and/or Tj profiles may be similarly charted. Nor do the numbers profiles graphed for each component, such as the two current or predicted operating conditions of the power consuming unit UC1, UC2, limit the scope of the claims and specification to these examples. Other combinations of power profile, Tj profile, coolant temperature regulation point, and/or coolant flow rates, may be similarly charted.

In FIG. 2, the first current or predicted operating condition of the power consuming unit (i.e., Use Case 1 or UC1), the power consumption level has various peaks, but at least one peak power consumption level corresponds to a UC1 maximum power level (i.e., $P_{M-1}$). Also, a UC1 maximum Tj level (i.e., $Tj_{M-1}$) is associated with the highest Tj level for UC1, which also occurs at roughly the same time as the $P_{M-1}$. Use Case 1 may represent a peak power output scenario (i.e., the highest power consumption scenario expected from the power consuming unit (e.g., SOC 12, 13). Thus, in UC1 $P_{M-1}$ corresponds to $P_{MAX}$, which is the highest power consumption level expected for that power consuming unit. Also, since $P_{M-1}$ corresponds to $P_{MAX}$, $Tj_{M-1}$ will similarly correspond to $Tj_{MAX}$, which is the highest Tj associated with the $P_{MAX}$.

The resource manager (e.g., 38) may try to maintain the Tj at all times below a predesignated Tj limit (e.g., 95° C.). To do so, the resource manager may set a coolant temperature regulation point (i.e., CTRP) low enough (e.g., 40° C.) to ensure the Tj profile never peaks above the predesignated Tj limit. Thus, the predesignated Tj limit may be selected and set to ensure the $P_{M-1}$ does not cause the $Tj_{M-1}$ to exceed the predesignated Tj limit.

Another coolant temperature regulation technique available to the resource manager is to alternatively or additionally change a coolant flow rate, such as by controlling the speed of a pump 46 in the chiller 40. For example, increasing the coolant flow rate may help speed up a change of the Tj.

In FIG. 2, the second current or predicted operating condition of the power consuming unit (i.e., Use Case 2 or UC2) also includes at least one highest peak power consumption level that corresponds to a UC2 maximum power level (i.e., $P_{M-2}$) and a UC2 maximum Tj (i.e., $Tj_{M-2}$) that is associated with the highest Tj level for UC2. It may be noted that $Tj_{M-2}$ does not exceed the predesignated Tj limit. However, unlike UC1 with its $Tj_{M-1}$ at or near the predesignated Tj limit, the $Tj_{M-2}$ is not as high as the $Tj_{M-1}$, which means there is temperature margin (or "cooling headroom") between the $Tj_{M-2}$ and the predesignated Tj limit. As used herein, the term "cooling headroom" refers to the difference between the predesignated Tj limit and the $Tj_{M-n}$ for any particular operating state or current or predicted operating condition of the power consuming unit.

When a particular $Tj_{M-n}$ is well below the predesignated Tj limit, such as by more than a predetermined threshold, that means the CTRP may be set higher without risking the $Tj_{M-n}$ exceeding the predesignated Tj limit. Maintaining the CTRP lower requires a greater expenditure of energy (e.g., running pumps and chiller equipment) than maintaining a higher CTRP. Thus, various embodiments may save energy by dynamically adjusting the CTRP based on the detected and/or predicted conditions.

Various embodiments include a closed loop coolant cooling technique that dynamically adapts a CTRP and/or a coolant flow rate, which may lead to less cooling headroom and corresponding cost savings, based on peak power levels (or power profiles) of the components being cooled that are predicted from simulated and/or historical power profiles and corresponding Tj profiles for various conditions. The power and Tj profiles may include $P_{M-n}$ and/or $Tj_{M-n}$ for one or more operation states or current or predicted operating conditions of the power consuming unit. In some embodiments, information regarding or defining such power and Tj profiles may be maintained in memory that is accessible to a processor of the resource manager (e.g., 38) or other controller. The resource manager may be a global resource manager that receives operating state information from or keeps track of major power consumption activities or functions of multiple electronic components, such as on a CPU or graphics card, and controls one or more components of a thermal cooling system (e.g., 36).

Various embodiments may reduce cooling headroom by changing the coolant temperature regulation point (CTRP) in response to an estimated peak Tj varying from a predesignated Tj limit by a predetermined threshold. For example, if the estimated peak Tj is more than a predetermined threshold below the predesignated Tj limit, such as for example 5%, the thermal cooling system may be providing unnecessary cooling or excess cooling headroom. The predetermined threshold may vary based on system requirements or operating parameters. In some systems, Tj management may be hierarchically managed to maximize performance and power. The predetermined threshold may be based on the performance of individual components (e.g., CPU or GPU), which may be limited based on temperature measurements by on-die temperature sensors within the SOC as a mechanism to contain Tj. Such a scheme working in conjunction with CTRP may allow flexibility, margin, and scenario trade-offs for how aggressively CTRP may be managed versus system power savings. In implementations in which such individual component limiting is possible it may allow for the relaxation of the predetermined threshold.

In FIG. 3, UC1 is similar to that described above with regard to FIG. 2. The power profile has various peaks, but at least one peak power consumption level corresponds to a UC1 maximum power level (i.e., $P_{M\text{-}1}$). Also, a UC1 maximum Tj level (i.e., $Tj_{M\text{-}1}$) is associated with the highest Tj level for UC1, which also occurs at roughly the same time as the $P_{M\text{-}1}$. UC2 also includes at least one highest peak power consumption level that corresponds to a UC2 maximum power level (i.e., $P_{M\text{-}2}$) and a UC2 maximum Tj (i.e., $Tj_{M\text{-}2}$) that is associated with the highest Tj level for UC2. However, unlike the power and Tj profiles for UC2 in FIG. 2, the power and Tj profiles for UC2 in FIG. 3 are higher, providing less cooling headroom between $Tj_{M\text{-}2}$ and the predesignated Tj limit. The reduction in cooling headroom may be achieved by increasing the CTRP for a period corresponding to UC2, in accordance with various embodiments. For example, in response to receiving a power profile input indicating that UC1 conditions are either occurring or about to occur, a processor of the resource manager may set the CTRP to a first CTRP-1, which in the above-noted examples relates to the lowest CTRP configured to handle the highest power consumption expected in the current or predicted operating condition of the power consuming unit. Later, in response to receiving a power profile input indicating that UC2 conditions are either occurring or about to occur, a processor of the resource manager may set the CTRP to a second CTRP-2, which is higher than the first CTRP-1.

In some embodiments, a processor may detect current conditions (e.g., from a received input) and look up a $P_{M\text{-}n}$, $Tj_{M\text{-}n}$, and/or the thermal ramp rate for those conditions. Based on the looked up $P_{M\text{-}n}$, $Tj_{M\text{-}n}$ and/or the thermal ramp rate, the processor may adjust the coolant temperature regulation point accordingly.

Various embodiments may be useful in environments in which the coolant temperature change latency (i.e., how long it takes the coolant to reach an adjusted coolant temperature regulation point) is not longer than the time it takes to prevent the $Tj_{M\text{-}n}$ from exceeding the predesignated Tj limit. A Tj ramp rate may be a value that is known from simulations and/or historical measurements. The Tj ramp rate may be used to determine how quickly the Tj will reach the $Tj_{M\text{-}n}$ for a particular component in a particular expected in the current or predicted operating condition of the power consuming unit. Increasing the CTRP will allow the coolant temperature to increase, but that increase in coolant temperature will take time. Thus, the Tj ramp rate may be used to determine how or when an adjustment in the CTRP will impact the $Tj_{M\text{-}n}$. For example, instead of maintaining the coolant temperature regulation point at 40° C., based on conditions indicating that the $Tj_{M\text{-}n}$ for the current conditions will not likely reach maximum Tj values, the coolant temperature regulation point may be relaxed (i.e., increased) to a level (e.g., 60° C.) that may minimize the cooling headroom for the current conditions.

Thus, before changing the CTRP in order to minimize or eliminate cooling headroom, other factors may be considered, such as the Tj ramp rate of the power consuming unit, which may reflect how quickly the Tj may increase. The Tj ramp rate may dictate whether there is sufficient time between peaks expected in the current or predicted operating condition of the power consuming unit to change the CTRP. Similarly, the thermal ramp rate may decide whether there is sufficient time between current or predicted operating conditions of the power consuming unit to change the CTRP. To consider a Tj ramp rate, a processor of the resource manager may estimate a time between adjacent power profile peaks to ensure there is sufficient time to change the CTRP. In this way, the CTRP may be changed in response to the time between adjacent power profile peaks exceeding a temporal threshold. In situations in which the time between adjacent power profile peaks does not exceed the temporal threshold, rather than or in addition to changing the CTRP the processor may increase the coolant flow rate, which may alter the Tj ramp rate enough to ensure the CTRP prevents the Tj max from exceeding the Tj limit.

Figure 4A:
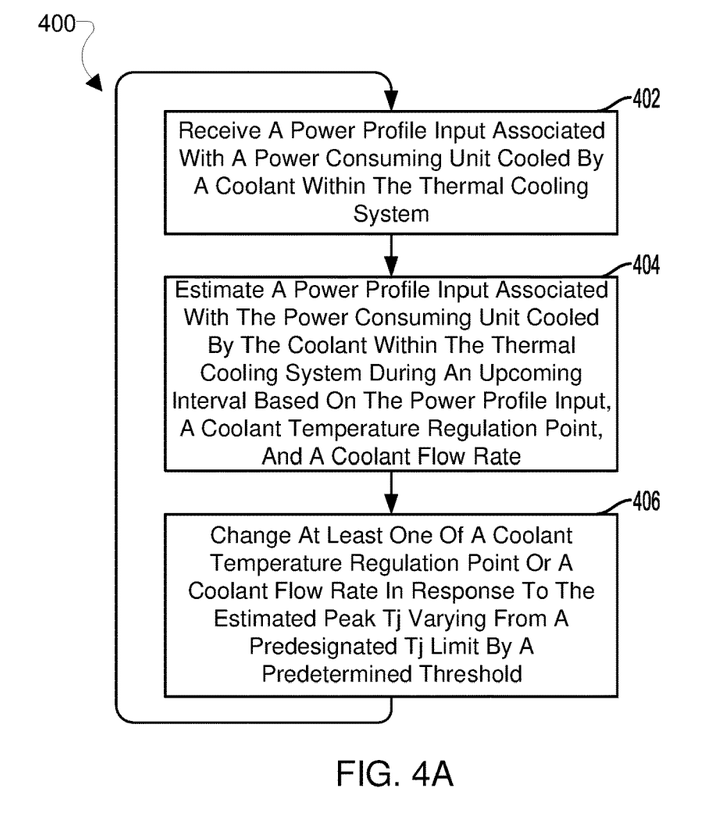
FIGS. 4A-4B are process flow diagrams illustrating methods for thermal cooling regulation based on power profiles according to some embodiments.
Figure 4B:
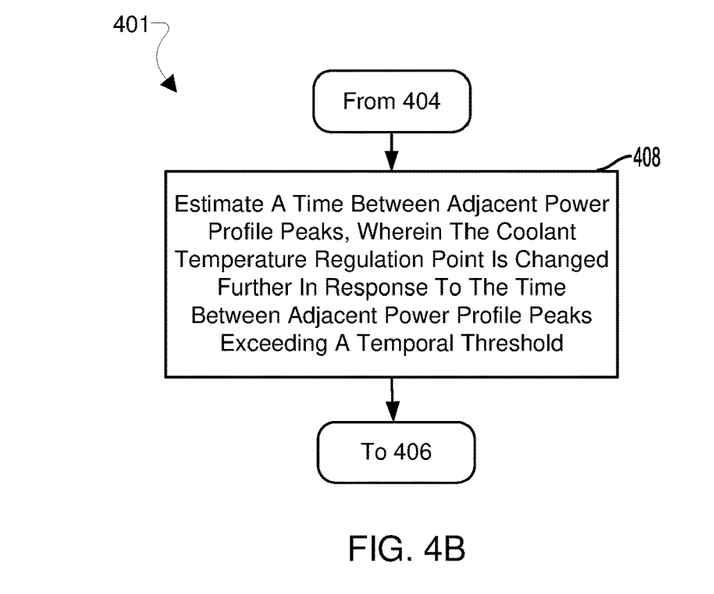

FIGS. 4A-4B illustrate methods for thermal cooling regulation based on power profiles of a power consuming unit according to some embodiments. With reference to FIGS. 1-4B, the methods 400, 401 may be implemented in a computing device (e.g., computing device 10, 11), in software executing in a processor (e.g., processor 14, 41), in general purpose hardware, in dedicated hardware, or in a combination of a software-configured processor and dedicated hardware, such as a processor executing software within a resource manager (e.g., 38) that includes other individual components, and various memory/cache controllers. In order to encompass the alternative configurations enabled in various embodiments, the hardware implementing the methods 400-401 is referred to herein as a "processor." Various embodiments may be implemented by a single processor or implemented in parallel or in series by at least two processors. The methods 400-401 are described referring to one processor for ease of explanation and clarity, which is not intended to limit the scope of the claims or the specification.

FIG. 4A is a process flow diagram illustrating an example method 400 performed by a processor of a thermal cooling system according to various embodiments. With reference to FIGS. 1A-4A, means for performing each of the operations of the method 400 may be a processor of the resource manager (e.g., 38) and/or a processor (e.g., 14, 41) of a SOC (e.g., 12, 13) or computing device (e.g., 10, 11) associated with the resource manager, and/or the like.

In block 402, the processor may receive a power profile input associated with a power consuming unit cooled by a coolant within the thermal cooling system. The processor may be part of a resource manager module in thermal cooling system coupled to a computing device. For example, the power profile input may be a signal indicating that operations performed by the computing device (or a component within the computing device) will be reduced from a current operating condition for an extended period of time. In the case of a motor vehicle computing device, this may correspond to when the vehicle is in park, running idle with no passengers. In the case of a commercial server farm, this may correspond to when a resource managing device enters an off-peak period in which fewer servers are online or using high levels of power.

In block 404, the processor may estimate a peak Tj of the power consuming unit during an upcoming interval based on the power profile input, a coolant temperature regulation point, and a coolant flow rate of the thermal cooling system. For example, the processor may determine an estimate of a maximum power level (maximum power consumption) for conditions associated with the power profile input received in block 402, such as from SOC max power and/or thermal ramp rate. In some embodiments, the processor may use a lookup table to determine a coolant temperature regulation point based on the input received in block 402 or the determined estimate of the maximum power level. In some embodiments, estimating the peak Tj may be further based on an estimated peak power consumption level of the power consuming unit during the upcoming interval.

In block 406, the processor may change at least one of the coolant temperature regulation point or the coolant flow rate of the thermal cooling system in response to the estimated peak Tj varying from a predesignated Tj limit by a predetermined threshold. In some embodiments, changing at least one of the coolant temperature regulation point or the coolant flow rate may reduce a difference between the predesignated Tj limit and an actual peak Tj of the power consuming unit during the upcoming interval. In some embodiments, changing the coolant temperature regulation point may include raising the coolant temperature regulation point in response to the estimated peak Tj being less than the predesignated Tj limit by the predetermined threshold. In some embodiments, changing the coolant flow rate may include lowering the coolant flow rate in response to the estimated peak Tj being less than the predesignated Tj limit by the predetermined threshold. In some embodiments, changing the coolant temperature regulation point may include lowering the coolant temperature regulation point to a lowest temperature regulation point associated with a maximum power consumption level of the power consuming unit in response to the estimated peak Tj being less that the predesignated Tj limit by the predetermined threshold.

The operations of the method 400 may be performed continuously or periodically to adjust the settings of the thermal cooling system in response to changes in the operating state or conditions of the power consuming unit. In this way, the processor may continuously or periodically repeat the operations of receiving an additional power profile input associated with the power consuming unit in block 402, estimating another peak Tj of the power consuming unit during another upcoming interval in block 404, and changing at least one of the coolant temperature regulation point or the coolant flow rate in response to the other estimated peak Tj varying from the predesignated Tj limit by the predetermined threshold in block 406.

FIG. 4B is a process flow diagram illustrating operations 401 that may be performed by a processor of a thermal cooling system as part of the method 400 for thermal cooling regulation based on power profiles according to various embodiments. With reference to FIGS. 1-4B, means for performing the operations of the method 401 may be a processor of the resource manager (e.g., 38) and/or a processor (e.g., 14, 41) of a SOC (e.g., 12, 13) or computing device (e.g., 10, 11) associated with the resource manager, and/or the like.

In some embodiments, after estimating another peak Tj of the power consuming unit during another upcoming interval in block 404, the processor may estimate a time between adjacent power profile peaks, and adjust or change the coolant temperature regulation point further in response to the time between adjacent power profile peaks exceeding a temporal threshold. For example, the processor may estimate the time between adjacent power profile peaks based on a Tj ramp rate and/or a lookup in a table containing Tj profile data, and determine whether to change at least one of the coolant temperature regulation point or the coolant flow rate further in response to the time meeting or exceeding a temporal threshold.

Base on the determination in block 408 the processor may change at least one of the coolant temperature regulation point or the coolant flow rate in block 406 as described. For example, if the time estimated in block 408 is less than the temporal threshold (i.e., less than a predetermined length of time), the processor may not change at least one of the coolant temperature regulation point or the coolant flow rate in block 406. However, if the estimate time meets or exceeds the temporal threshold, the processor may change at least one of the coolant temperature regulation point or the coolant flow rate in block 406 as described.

Figure 5:
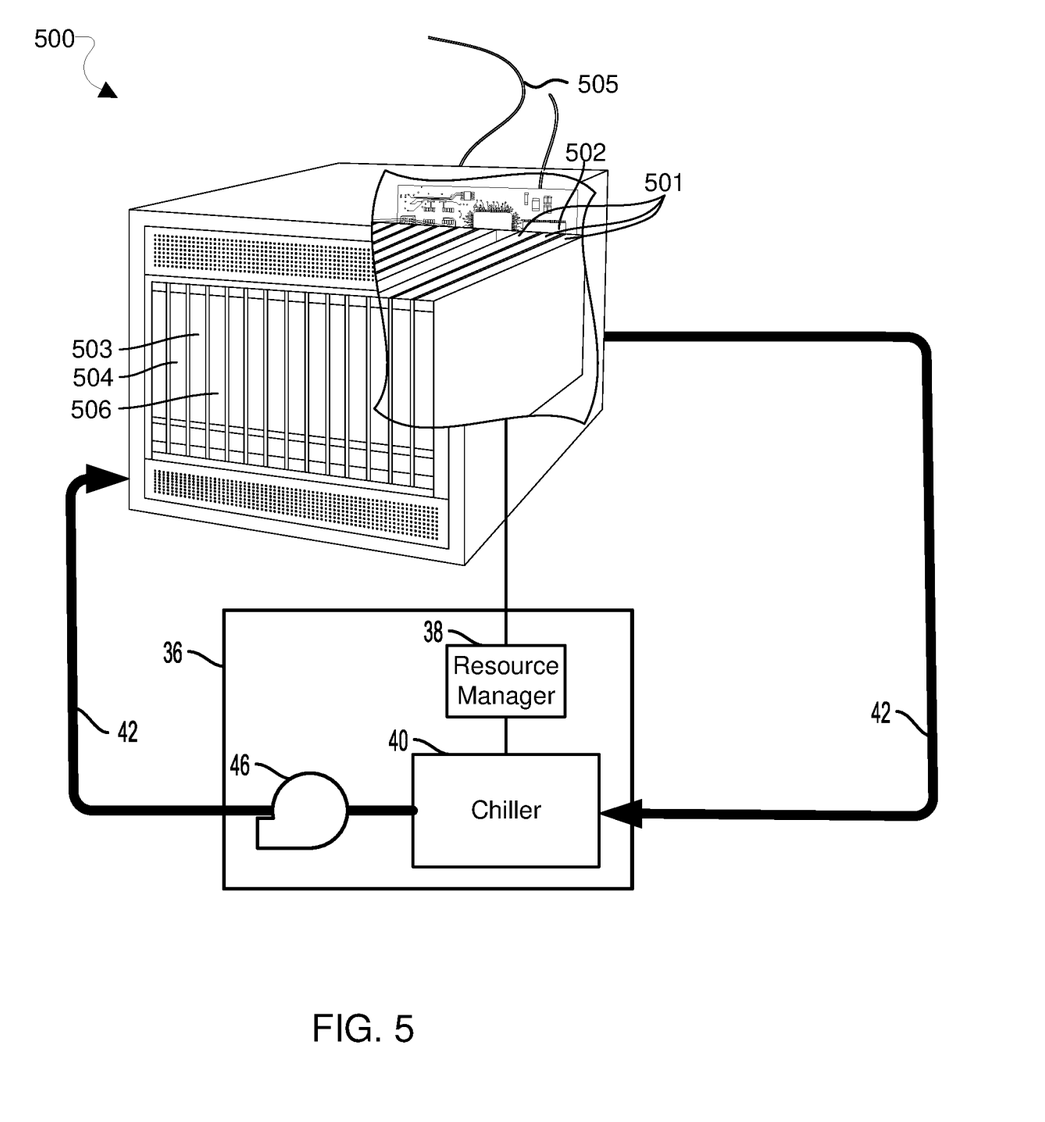
FIG. 5 is a component block diagram illustrating an example server suitable for implementing various embodiments.

The various embodiments (including, but not limited to, embodiments described above with reference to FIGS. 1-4B) may also be implemented in fixed computing systems, such as any of a variety of commercially available servers. An example server 500 is illustrated in FIG. 5. Such a server 500 typically includes one or more multicore processor units 501 coupled to volatile memory 502 and a large capacity nonvolatile memory, such as a disk drive 504. The server 500 may also include a floppy disc drive, compact disc (CD) or digital versatile disc (DVD) disc drive 506 coupled to the processor 501. The server 500 may also include network access ports 503 coupled to the multicore processor assemblies 501 for establishing network interface connections with a network 505, such as a local area network coupled to other broadcast system computers and servers, the Internet, the public switched telephone network, and/or a cellular data network. As illustrated in FIG. 5, the server or various multicore processor assemblies 501 may be thermally coupled to a heat exchanger (not shown in FIG. 5) that is cooled by a thermal cooling system 36 including a resource manager 38, chiller 40, cooler conduits and a coolant pump 46 as described with reference to FIGS. 1A and 1B.

Computer program code or "program code" for execution on a programmable processor for carrying out operations of the various embodiments may be written in a high level programming language such as C, C++, C #, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

Implementation examples are described in the following paragraphs. While some of the following implementation examples are described in terms of an example computing device memory system, further example implementations may include: the example functions of the computing device memory system discussed in the following paragraphs implemented as methods of the following implementation examples; and the example computing device memory system discussed in the following paragraphs implemented by a computing device memory system including means for performing functions of the computing device memory system of the following implementation examples.

Example 1. A method implemented by a processor of a thermal cooling system including receiving, by the processor, a power profile input associated with a power consuming unit cooled by a coolant within the thermal cooling system, estimating, by the processor, a peak Tj of the power consuming unit during an upcoming interval based on the power profile input, a coolant temperature regulation point, and a coolant flow rate, and changing, by the processor, at least one of the coolant temperature regulation point or the coolant flow rate in response to the estimated peak Tj varying from a predesignated Tj limit by a predetermined threshold.

Example 2. The method of example 1, in which estimating the peak Tj is further based on an estimated peak power consumption level of the power consuming unit during the upcoming interval.

Example 3. The method of either of examples 1 or 2, in which changing at least one of the coolant temperature regulation point or the coolant flow rate reduces a difference between the predesignated Tj limit and an actual peak Tj of the power consuming unit during the upcoming interval.

Example 4. The method of any of examples 1-3, in which changing the coolant temperature regulation point includes raising the coolant temperature regulation point in response to the estimated peak Tj being less than the predesignated Tj limit by the predetermined threshold.

Example 5. The method of any of examples 1-4, in which changing the coolant flow rate includes lowering the coolant flow rate in response to the estimated peak Tj being less than the predesignated Tj limit by the predetermined threshold.

Example 6. The method of any of examples 1-5, in which changing the coolant temperature regulation point includes lowering the coolant temperature regulation point to a lowest temperature regulation point associated with a maximum power consumption level of the power consuming unit in response to the estimated peak Tj being less that the predesignated Tj limit by the predetermined threshold.

Example 7. The method of any of examples 1-6 further including continuously or periodically repeating operations of receiving an additional power profile input associated with the power consuming unit, estimating another peak Tj of the power consuming unit during another upcoming interval, and changing at least one of the coolant temperature regulation point or the coolant flow rate in response to the other estimated peak Tj varying from the predesignated Tj limit by the predetermined threshold.

Example 8. The method of any of examples 1-7 further including estimating, by the processor, a time between adjacent power profile peaks, wherein the coolant temperature regulation point is changed further in response to the time between adjacent power profile peaks exceeding a temporal threshold.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein but is to be accorded the widest scope consistent with the following claims and the principles and novel features disclosed herein.

What is claimed is:

1. A method performed by a processor of a thermal cooling system, comprising:
receiving, by the processor, a power profile input associated with a power consuming unit cooled by a coolant within the thermal cooling system;
estimating, by the processor, a peak junction temperature Tjest of a semiconductor device of the power consuming unit during an upcoming time interval based on the power profile input, a coolant temperature regulation point, and a coolant flow rate; and
changing, by the processor, at least one of the coolant temperature regulation point or the coolant flow rate based on a determination that at least two successive estimated peak junction temperatures Tjest vary from a predesignated junction temperature limit Tjlim by a predetermined temperature threshold within a threshold time interval.

2. The method of claim 1, wherein estimating the peak junction temperature Tjest is further based on an estimated peak power consumption level of the power consuming unit during the upcoming time interval.

3. The method of claim 1, wherein changing at least one of the coolant temperature regulation point or the coolant flow rate reduces a difference between the predesignated junction temperature limit Tjlim and an actual peak junction temperature Tjact of the power consuming unit measured during the upcoming time interval.

4. The method of claim 1, wherein changing the coolant temperature regulation point comprises raising the coolant temperature regulation point in response to the estimated peak junction temperature Tjest being less than the predesignated junction temperature limit Tjlim by the predetermined temperature threshold.

5. The method of claim 1, wherein changing the coolant flow rate comprises lowering the coolant flow rate in response to the estimated peak junction temperature Tjest being less than the predesignated junction temperature limit Tjlim by the predetermined temperature threshold.

6. The method of claim 1, wherein changing the coolant temperature regulation point comprises lowering the coolant temperature regulation point to a lowest temperature regulation point associated with a maximum power consumption level of the power consuming unit in response to the estimated peak junction temperature Tjest being less than the predesignated temperature limit Tjlim by the predetermined temperature threshold.

7. The method of claim 1, further comprising continuously or periodically repeating operations of receiving an additional power profile input associated with the power consuming unit, estimating another peak junction temperature Tjest of the power consuming unit during another upcoming interval, and changing at least one of the coolant temperature regulation point or the coolant flow rate in response to the other estimated peak junction temperature Tjest varying from the predesignated temperature limit Tjlim by the predetermined temperature threshold.

8. A thermal cooling system, comprising:
a cooling system; and
a processor coupled to the cooling system and configured to:
receive a power profile input associated with a power consuming unit cooled by coolant within the cooling system;
estimate a peak junction temperature Tjest of a semiconductor device of the power consuming unit during an upcoming time interval based on the power profile input, a coolant temperature regulation point, and a coolant flow rate; and
change at least one of the coolant temperature regulation point or the coolant flow rate based on a determination that at least two successive estimated peak junction temperatures Tjest vary from a predesignated junction temperature limit Tjlim by a predetermined temperature threshold within a threshold time interval.

9. The thermal cooling system of claim 8, wherein the processor is configured such that estimating the peak junction temperature Tjest is further based on an estimated peak power consumption level of the power consuming unit during the upcoming time interval.

10. The thermal cooling system of claim 8, wherein the processor is configured such that changing at least one of the coolant temperature regulation point or the coolant flow rate reduces a difference between the predesignated junction temperature limit Tjlim and an actual peak junction temperature Tjact of the power consuming unit measured during the upcoming time interval.

11. The thermal cooling system of claim 8, wherein the processor is configured such that changing the coolant temperature regulation point comprises raising the coolant temperature regulation point in response to the estimated peak junction temperature Tjest being less than the predesignated junction temperature limit Tjlim by the predetermined temperature threshold.

12. The thermal cooling system claim 8, wherein the processor is configured such that changing the coolant flow rate comprises lowering the coolant flow rate in response to the estimated peak junction temperature Tjest being less than the predesignated junction temperature limit Tjlim by the predetermined temperature threshold.

13. The thermal cooling system of claim 8, wherein the processor is configured such that changing the coolant temperature regulation point comprises lowering the coolant temperature regulation point to a lowest temperature regulation point associated with a maximum power consumption level of the power consuming unit in response to the estimated peak junction temperature Tjest being less than the predesignated junction temperature limit Tjlim by the predetermined temperature threshold.

14. A thermal cooling system, comprising:
means for receiving a power profile input associated with a power consuming unit cooled by a coolant within the thermal cooling system;
means for estimating a peak junction temperature Tjest of a semiconductor device of the power consuming unit during an upcoming time interval based on the power profile input, a coolant temperature regulation point, and a coolant flow rate; and
means for changing at least one of the coolant temperature regulation point or the coolant flow rate based on a determination that at least two successive estimated peak junction temperatures Tjest vary from a predesignated junction temperature limit Tjlim by a predetermined temperature threshold within a threshold time limit.

15. The thermal cooling system of claim 14, wherein means for estimating the peak junction temperature Tjest of the semiconductor device of the power consuming unit comprises means for estimating the peak junction temperature Tjest based on an estimated peak power consumption level of the power consuming unit during the upcoming time interval.

16. The thermal cooling system of claim 14, wherein means for changing at least one of the coolant temperature regulation point or the coolant flow rate comprises means for changing at least one of the coolant temperature regulation point or the coolant flow rate to reduce a difference between the predesignated junction temperature limit Tjlim and an actual peak Tjact of the power consuming unit during the upcoming time interval.

17. The thermal cooling system of claim 14, wherein means for changing the coolant temperature regulation point comprises at least one of:
    means for raising the coolant temperature regulation point in response to the estimated peak junction temperature Tjest being less than the predesignated junction temperature limit Tjlim by the predetermined temperature threshold; or
    means for lowering the coolant temperature regulation point to a lowest temperature regulation point associated with a maximum power consumption level of the power consuming unit in response to the estimated peak junction temperature Tjest being less than the predesignated junction temperature limit Tjlim by the predetermined temperature threshold.

18. A non-transitory processor-readable storage medium having stored thereon processor-executable instructions configured to cause a processor of a thermal cooling system to perform operations comprising:
    receiving a power profile input associated with a power consuming unit cooled by a coolant within the thermal cooling system;
    estimating a peak junction temperature Tjest of a semiconductor device of the power consuming unit during an upcoming interval based on the power profile input, a coolant temperature regulation point, and a coolant flow rate; and
    changing at least one of the coolant temperature regulation point or the coolant flow rate based on a determination that at least two successive estimated peak junction temperatures Tjest varying from a predesignated junction temperature limit Tjlim by a predetermined temperature threshold within a threshold time interval.

* * * * *